(12) United States Patent
Phelps

(10) Patent No.: US 7,155,635 B1
(45) Date of Patent: Dec. 26, 2006

(54) HANDLING LINK FAILURES IN REMOTE MIRRORING APPLICATIONS USING SNAPSHOTS

(75) Inventor: Adam M. Phelps, San Francisco, CA (US)

(73) Assignee: 3PARdata, Inc., Fremont, CA (US)

( * ) Notice: Subject to any disclaimer, the term of this patent is extended or adjusted under 35 U.S.C. 154(b) by 238 days.

(21) Appl. No.: 10/773,699

(22) Filed: Feb. 6, 2004

(51) Int. Cl.
  *G06F 12/16* (2006.01)
(52) U.S. Cl. .............................. 714/6; 714/34; 714/18; 711/162
(58) Field of Classification Search ................ 711/162
  See application file for complete search history.

(56) References Cited

U.S. PATENT DOCUMENTS

2001/0010070 A1 * 7/2001 Crockett et al. ............ 711/162
2003/0084242 A1 * 5/2003 Strange et al. .............. 711/114

* cited by examiner

*Primary Examiner*—B. James Peikari
(74) *Attorney, Agent, or Firm*—Patent Law Group LLP; David C. Hsia

(57) ABSTRACT

A method for resynchronizing a primary volume in a primary system and a secondary volume in a secondary system over a network includes, when a network connection between the primary system and the secondary system is interrupted, creating a snapshot of the primary volume and determining data updates transmitted from the primary system to the secondary system that were not acknowledged by the secondary system. The method further comprises, when the network connection is reestablished, determining differences between the snapshot and the primary volume, transmitting the differences and the unacknowledged data updates from the primary system to the secondary system, and updating the secondary volume with the differences and the unacknowledged data, wherein the secondary volume becomes an updated copy of the primary volume.

7 Claims, 2 Drawing Sheets

1

HANDLING LINK FAILURES IN REMOTE MIRRORING APPLICATIONS USING SNAPSHOTS

FIELD OF INVENTION

This invention relates to remote mirroring of data storage systems.

DESCRIPTION OF RELATED ART

Remote mirroring protects valuable data against unplanned and planned downtimes of data storage systems. Unplanned downtimes may be caused by hardware or system failures, human errors, computer viruses, software glitches, natural disasters, and malicious acts. Planned downtimes may be caused by scheduled maintenances such hardware or system upgrades. Remote mirroring may also be used for migrating data from one storage system to another.

In a typical remote mirroring implementation, data are replicated and synchronized between a primary local system and a secondary remote system by sending each data update on the primary system to the secondary system over a network. When the network connection between the primary system and the secondary system is lost, or when the secondary remote system is lost, there is a need for a method to resynchronize the two systems.

SUMMARY

In one embodiment of the invention, a method for resynchronizing a primary volume in a primary system and a secondary volume in a secondary system over a network includes, when a network connection between the primary system and the secondary system is interrupted, creating a snapshot of the primary volume and determining data updates transmitted from the primary system to the secondary system that were not acknowledged by the secondary system. The method further comprises, when the network connection is reestablished, determining differences between the snapshot and the primary volume, transmitting the differences and the unacknowledged data updates from the primary system to the secondary system, and updating the secondary volume with the differences and the unacknowledged data, wherein the secondary volume becomes an updated copy of the primary volume.

DETAILED DESCRIPTION

In accordance with the invention, a primary system and a secondary system are connected by one or more network links. The primary system is used as the working volumes for a host, whereas the secondary system is used as the backup volumes for the working volumes. Thus, data is transferred across the network links from the primary system to the secondary system.

The primary system includes one or more "primary volumes." These primary volumes are writeable data volumes that accept changes from host applications. The secondary system includes one or more "secondary volumes." These secondary volumes are also writeable data volumes. Each of these secondary volumes is paired with a primary volume for which it will receive mirrored data.

When the network connection is initially established, the secondary volumes are synchronized with the primary volumes. This is accomplished by sending the entire data space of the primary volumes over the network and writing that data to the corresponding secondary volumes. Additionally, for the secondary volumes to stay synchronized, any new data that is written to the primary volumes must also be transmitted and recorded on the secondary volumes.

To resynchronize the secondary system with the primary system after a connection failure, the primary system needs to maintain information on all changes that are made to the primary volumes after the connection was lost. Thus, snapshots are used to track changes to the primary volumes after the network connection is lost. When a connection failure is detected, writes to all mirrored primary volumes are temporarily blocked while snapshots are taken of these primary volumes. In addition, on the primary system there may be writes that were transmitted but not yet acknowledged as completed by the secondary system. These writes may already have been applied to the primary volumes at the time the snapshots were taken. A list of these writes must also be kept in order to fully resynchronize the secondary system as these writes may not have been completed prior to the connection failure.

When the connection is reestablished, any changes that occurred to the primary volumes that were not duplicated on the secondary system must be transmitted. In addition to the list of unacknowledged writes, the snapshots that were taken are used to determine how the primary volumes have changed after the snapshots were created. Using a snapshot difference procedure, these "resynchronization" snapshots are compared with the primary volumes. All changes that are found during this comparison are transmitted. Once complete, the resynchronization snapshots are deleted. At the completion of this resynchronization, the secondary volumes will be synchronized with the primary volumes, and remote mirroring can proceed as normal.

Figure 1:
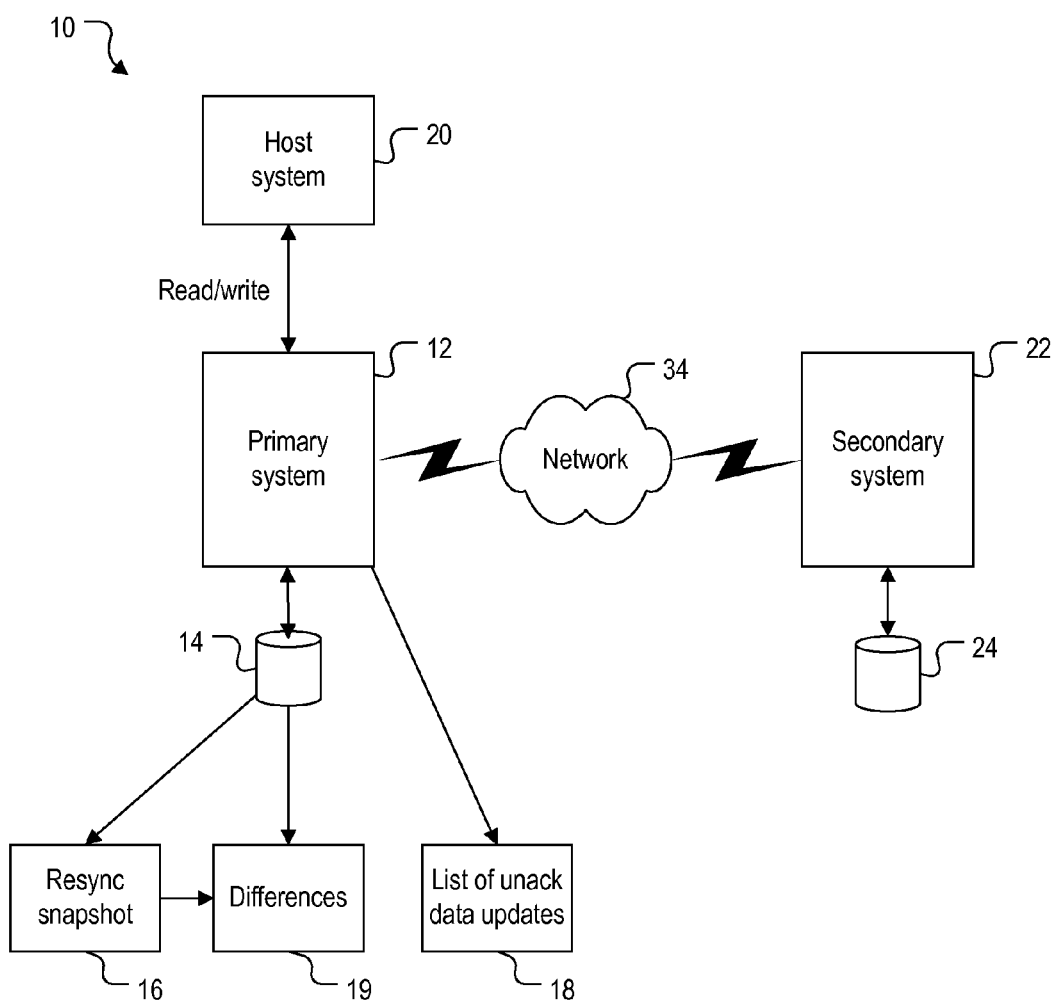
FIG. 1 illustrates a remote mirroring system in one embodiment of the invention.

FIG. 1 shows a remote mirroring system 10 in one embodiment of the invention. System 10 includes a primary system 12 that is mirrored with a secondary system 22 over a network 34. In one embodiment, primary system 12 and secondary system 22 are scalable cluster data systems described in U.S. Pat. No. 6,658,478, entitled "Data Storage System", filed Aug. 4, 2000; and U.S. patent application Ser. No. 09/833,681, entitled "Node Controller For A Data Storage System", filed Jun. 18, 2001, which are incorporated by reference in their entirety. Primary system 12 includes a primary volume 14 that provide data storage to one or more host systems 20. In one embodiment, primary volume 14 is a virtual volume described in U.S. application Ser. No. 10/655,963, entitled "Efficient and Reliable Virtual Volume Mapping", filed Sep. 4, 2003, which is incorporated by reference in its entirety. Although only one primary volume is shown, multiple primary volumes can be used.

Secondary system 22 includes a secondary volume 24 that mirrors primary volume 14 in primary system 12. In one embodiment, the secondary volume is a virtual volume like the primary volume. Primary system 12 sends mirrored data over network 34 to secondary system 22. Typically, secondary system 22 is located at a remote site away from primary system 12.

Figure 2:
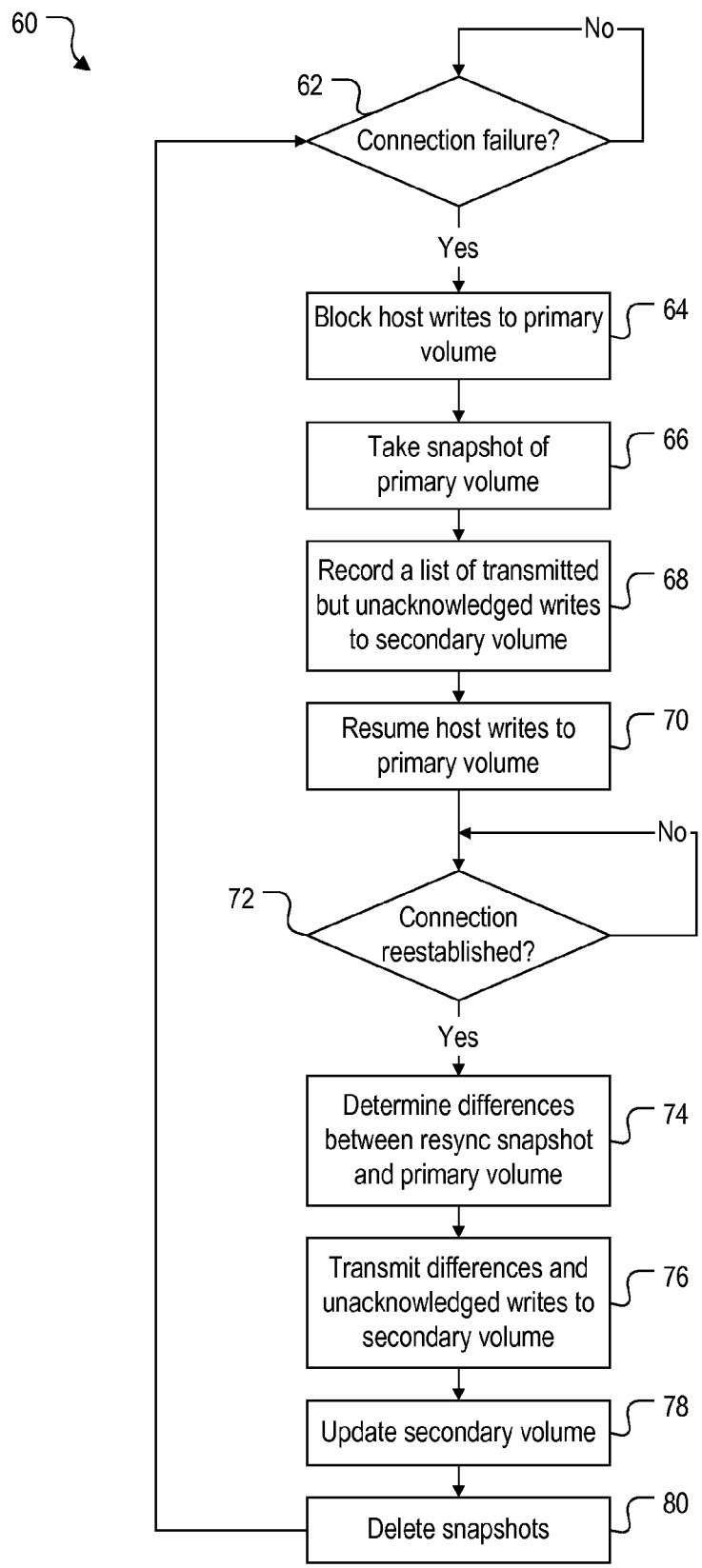
FIG. 2 is a flowchart of a method for resynchronizing the remote mirroring system of FIG. 1 in one embodiment of the invention.

FIG. 2 is a flowchart of a method 60 for using snapshots to resynchronize mirrored volumes in one embodiment of the invention.

In step 62, primary system 12 determines if the network connection between primary system 12 and secondary system 22 has been interrupted. Network connection is interrupted when network 34 or secondary system 22 fails. If the network connection has been interrupted, then step 62 is followed by step 64. Otherwise step 62 repeats as primary system 12 continues to monitor the network connection.

In step 64, primary system 12 blocks all host writes to primary volume 14 so a snapshot of primary volume 14 can be taken. Step 64 is followed by step 66.

In step 66, primary system 12 takes a resynchronization snapshot 16 of primary volume 14. In one embodiment, resynchronization snapshot 16 is the type described in U.S. patent application Ser. No. 10/655,961, entitled "Read/Write Snapshots", filed Sep. 4, 2003; and U.S. patent application Ser. No. 10/237,432, entitled "Determining Differences Between Snapshots", filed Sep. 6, 2002, which are incorporated by reference in their entirety. In such an embodiment, snapshot 16 consists of exception tables storing the original data in primary volume 14 when the original data is overwritten. In other words, a write to primary volume 14 after the creation of snapshot 16 and before the creation of the next snapshot will cause a write of the original data to snapshot 16. Step 66 is followed by step 68.

In step 68, primary system 12 determines a list 18 of data updates that were sent from primary system 12 to secondary system 22 but not acknowledged as completed by secondary system 22. List 18 is used later to fully resynchronize secondary system 22 with primary system 12 because these data updates may not have been completed. Step 68 is followed by step 70.

In step 70, primary system 12 allows host writes to primary volume 14 to resume. Step 70 is followed by step 72.

In step 72, primary system 12 determines if the network connection between primary system 12 and secondary system 22 has been reestablished. The network connection can be reestablished when network 34 or secondary system 22 is repaired. If the network connection has been reestablished, then step 72 is followed by step 74. Otherwise step 72 repeats as primary system 12 continues to monitor the network connection.

In step 74, primary system 12 determines differences 19 between primary volume 14 and resynchronization snapshot 16. Differences 19 represent the data in primary volume 14 that were changed between when the network connection is interrupted and reestablished. In one embodiment, primary system 12 determines differences 19 using a method described in U.S. patent application Ser. No. 10/237,432, entitled "Determining Differences Between Snapshots", filed Sep. 6, 2002, which has been previously incorporated by reference in its entirety. In such an embodiment, primary system 12 examines the exception tables of resynchronization snapshot 16 to determine the data in primary volume 14 that were changed between when the network connection is interrupted and reestablished. Step 74 is followed by step 76.

In step 76, primary system 12 transmits the differences 19 between primary volume 14 and resynchronization snapshot 16 as data updates to secondary system 22. Primary system 12 also transmits the data updates in list 18 to secondary system 22. Step 76 is followed by step 78.

In step 78, secondary system 22 updates secondary volume 24 with the data received from primary system 12. Thus, primary volume 14 is now replicated in secondary volume 24. Step 78 is followed by step 80.

In step 80, primary system 12 deletes resynchronization snapshot 16 as it is no longer needed. Step 80 is followed by step 62 and method 60 repeats.

Various other adaptations and combinations of features of the embodiments disclosed are within the scope of the invention. Numerous embodiments are encompassed by the following claims.

What is claimed is:

1. A method for resynchronizing a primary volume in a primary system and a secondary volume in a secondary system over a network, comprising:
  when a network connection between the primary system and the secondary system is interrupted:
    creating a snapshot of the primary volume, the snapshot identifying only original data from the primary volume that are overwritten after the snapshot is created;
    determining data updates transmitted from the primary system to the secondary system that were not acknowledged by the secondary system;
  when the network connection is reestablished:
    based on the snapshot, determining new data written to the primary volume between when the network connection is interrupted and reestablished; and
    transmitting the new data and the unacknowledged data updates from the primary system to the secondary system.

2. The method of claim 1, further comprising, when the network connection is reestablished, updating the secondary volume with the new data and the unacknowledged data updates, wherein the secondary volume becomes an updated copy of the primary volume.

3. The method of claim 1, prior to said creating a snapshot, further comprising blocking writes to the primary volume.

4. The method of claim 3, after said creating a snapshot and said determining data updates, further comprising resuming writes to the primary volume.

5. The method of claim 1, further comprising deleting the snapshot after said transmitting.

6. The method of claim 1, wherein said determining new data comprises:
  searching for exceptions in exception tables in the snapshot, wherein the exception tables only identify the original data that were (1) in the primary volume at a time the snapshot was created and (2) later overwritten after the snapshot was created; and
  based on the original data in the snapshot, looking up the new data in the primary volume that correspond to the original data.

7. A method for resynchronizing a primary volume in a primary system and a secondary volume in a secondary system over a network, comprising:
  when a network connection between the primary system and the secondary system is interrupted:
    blocking writes to the primary volume;
    creating a snapshot of the primary volume, the snapshot identifying only original data from the primary volume that are overwritten after the snapshot is created;
    resuming writes to the primary volume;
  when the network connection is reestablished:

based on the snapshot, determining new data written to the primary volume between when the network connection is interrupted and reestablished, said determining comprising:

searching for exceptions in exception tables in the snapshot, wherein the exception tables only identify the original data that were (1) in the primary volume at a time the snapshot was created and (2) later overwritten after the snapshot was created;

based on the original data in the snapshot, looking up the new data in the primary volume that correspond to the original data;

transmitting the new data and unacknowledged data updates from the primary system to the secondary system;

updating the secondary volume with the new data and the unacknowledged data updates, wherein the secondary volume becomes an updated copy of the primary volume; and deleting the snapshot after said transmitting.

\* \* \* \* \*